Jan. 24, 1961  W. A. SCHEUBLEIN, JR., ET AL  2,969,230
VEHICLE SPRING DEVICE
Filed Feb. 4, 1959
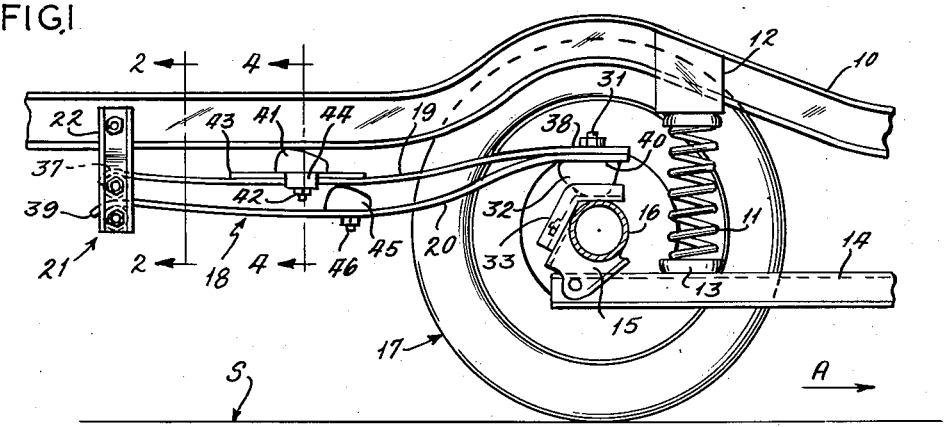
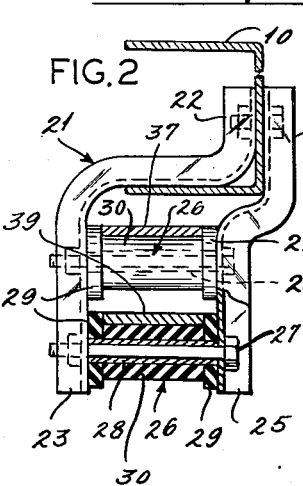
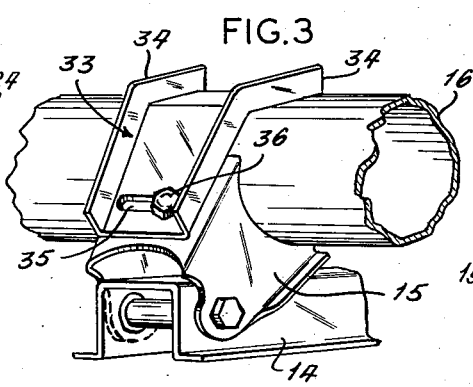
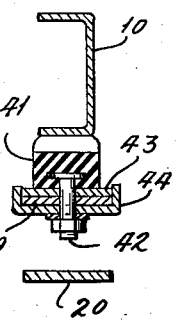
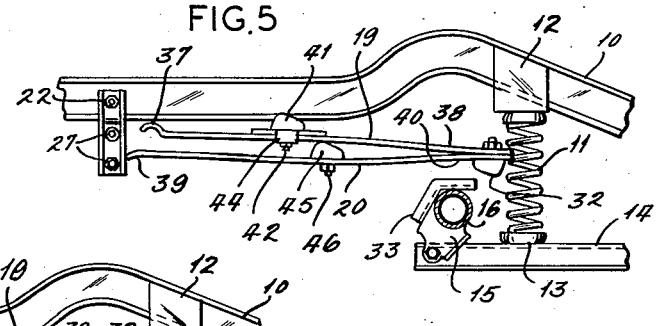
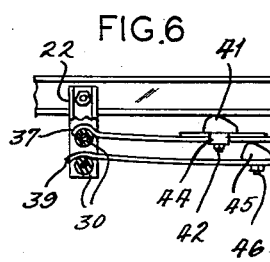
INVENTORS:
WILLIAM A. SCHEUBLEIN JR.
EDMUND A. CHECK
By Gravely, Lieder & Woodruff
ATTORNEYS.

United States Patent Office 2,969,230
Patented Jan. 24, 1961

2,969,230

VEHICLE SPRING DEVICE

William A. Scheublein, Jr., St. Louis, and Edmund A. Check, Kansas City, Mo., assignors to Moog Industries, Inc., St. Louis, Mo., a corporation of Missouri Filed Feb. 4, 1959, Ser. No. 791,178

8 Claims. (Cl. 267—16)

This invention relates to auxiliary spring devices for vehicles, and is more particularly directed to an improved auxiliary spring device of compound cantilever character.

Vehicle spring suspension systems tend more and more to go to soft ride characteristics which is fine for the comfort of riders, especially in passenger vehicles. However, the soft ride is clearly limited to a predetermined average riding load of, say two to four passengers and a normal complement of light weight luggage. When the load exceeds the average trouble is encountered in excessive bottoming on the axles and rebound reactions, both of which are undesirable and adversely affect the passengers. Furthermore, the soft ride characteristics unnecessarily restrict the load capacity of such vehicles so that economy of operation is difficult to obtain in keeping with the structural ability to carry a load of passengers or luggage.

It is known that a high proportion of passenger vehicle owners desire to carry loads in excess of the ability of the spring systems to support the loads and still keep the vehicle body at a safe height to avoid striking the axles. Therefore, it is an object of this invention to provide auxiliary spring devices which will for average load or light load not materially change or stiffen the soft ride characteristics, but for full load conditions will come into operation to support the vehicle body and assist the principal spring system in its function.

It is also an object of the present invention to provide novel and simple auxiliary spring devices which may be installed quickly and without altering or disconnecting the principal spring system.

It is a further object of the present invention to provide auxiliary spring devices which may be incorporated in a vehicle equipped with coil type springs.

A further object is to provide auxiliary spring devices which may be preassembled in kit form so that it will not be necessary to call upon highly skilled mechanics to effect the installation and so that ordinary tools may be used.

These and other objects will be pointed out hereinafter in the detailed description of a preferred embodiment of the invention which consists, but without limitation, of cooperating leaf spring members disposed effectively between the vehicle axle and frame to act in concert with the principal vehicle spring system for the usual up and down motion of the body. The devices also consist in support means for the leaf spring members so that a compound cantilever action is obtained, whereby the springs may act progressively to build-up a load sustaining resistance in accordance with the vehicle body motion or axle motion relative to the body when the vehicle moves over a rough or wavy road surface.

The invention further consists in those parts, assemblies and components which will be described in connection with the accompanying drawings, wherein:

Fig. 1 is a fragmentary view of a vehicle frame showing a rear wheel and axle in relation to a principal coil spring suspension system, and wherein the present auxiliary spring device is incorporated;

Fig. 2 is a greatly enlarged sectional view taken at line 2—2 in Fig. 1 to show a preferred mounting bracket carried by the vehicle frame;

Fig. 3 is a fragmentary perspective view of the vehicle axle showing the saddle member thereon to receive one end of the novel spring device shown in Fig. 1;

Fig. 4 is a transverse sectional view taken at line 4—4 in Fig. 1; and

Figs. 5 and 6 are respectively views like Fig. 1, but showing the initial step of inserting the spring device with the vehicle raised and the step of sliding the spring device into position before lowering the vehicle.

In the drawings, the usual channel frame 10 for the vehicle chassis is supported by a coil spring 11 located between a block 12 on the frame and a pad 13 carried by a suspension arm 14 having one end pivoted from a bracket 15 on the axle housing 16 and the other end (not shown) connected back to the frame. The axle housing 16 is supported in conventional manner from the wheel 17, and in Fig. 1 arrow A indicated the direction of forward motion of the vehicle relative to the road surface S.

The present invention is embodied in an auxiliary spring device 18 disposed between the axle housing 17 and the frame 10 to exert a load resisting leverage after an initial amount of compression in the usual coil spring 11, whereby the spring leaves are caused to work progressively for conditions of overload or for excessive vertical movement of the frame 10 relative to the axle housing 16. The device 18 includes two leaf springs 19 and 20 carried at the trailing ends by a bracket type hanger 21 (Fig. 2) comprising an inner channel-shaped member 22 having an off-set leg 23 and an outer channel-shaped member 24 also having an off-set leg 25 spaced from leg 23. The legs 23 and 25 jointly carry spaced hangers 26 which are similar and comprise a fastening bolt 27, a spacer sleeve 28 on the bolt, resilient washers 29 on the sleeve 28 held in spaced relation by a resilient sleeve 30.

The forward ends of the springs 19 and 20 are placed in abutment and fastened together by a threaded element 31 which also attaches a resilient bumper or pad 32 to the underside of leaf 20. The bumper 32 rides in a channel-like saddle member 33 (Fig. 3) which has side walls 34 and a slot 35 to receive a connecting element 36 which engages in the bracket 15. The saddle 33 may be moved sidewise on the axle housing 16 to the extent of the slot length and when in the desired position is secured by means 36.

The leaf spring device 18 (Figs. 1, 2 and 4) is constructed so that the upper leaf 19 has a bent or preformed trailing end 37 and a flat forward end 38. The lower leaf 20 also has a preformed trailing end 39 and a flat forward end 40. The flat forward ends are held together as noted above by the threaded element 31 which may be a stud having its head molded into the body of the resilient bumper 32. The trailing ends 37 and 39 of the respective leaf springs 19 and 20 are, as shown in Figs. 1 and 2, supported in spaced relation on the respective resilient sleeves 30 in the hanger assembly 21. The upper leaf spring 19 is provided between its ends 37 and 38, but somewhat closer to end 37, with a resilient striker or cushion 41 having a molded stud-type fastening element 42 to attach the cushion thereto, together with a short auxiliary spring leaf 43. The element 42 (Fig. 4) also secures a channel clip 44 under the leaf 19 so that the auxiliary leaf 43 cannot turn or fan-out while in service. Leaf 20 also carries a resilient striker or cushion 45 which is similar to cushion 41 and has a molded-in securing stud 46. The cushion 45 is adjacent cushion 41 but off-set in a direction closer to the saddle 32 so that the spacing between the cushion 41 and bumper 32 is greater than the spacing between bumper 32 and cushion 45.

The device 18 in the embodiment chosen for illustrating the invention is a two-leaf helper or overload spring with the joined ends 38 and 40 of the leaves 19 and 20 resting on the axle saddle 33, with the rearward spaced ends 37 and 39 individually supported in the frame hanger 21, and with strikers or cushions 41 and 45 between the ends. The helper spring device 18, therefore, has a first point of support at the saddle 33 which is fixed relative to the road surface S (neglecting the flexing of the tire). The other points of support are on the vehicle frame 10 at the hanger 21 where each leaf has its separate support upon a resilient sleeve 30. It appears obvious, upon inspection of Figs. 5 and 6 that with the ends of the leaf spring device 18 mounted as shown there will be a certain amount of resistance offered to vertical movement of the frame 10 because of the initial flexing of the leaf 19 to get it under the frame. The leaf 19 acts against the downward vertical movement of the frame and is no longer free as the striker 41 bears on the adjacent flange of the frame 10. Likewise, leaf 20 with its bumper 45 located under leaf 19 will flex and resist vertical movement of the frame 10, but its rate of resistance will be different from that for leaf 19 since the points of load application are different.

The action of the spring leaf device 18 is understood by considering the axle housing 16 as a fixed support so that the bumper 32 has no vertical motion. The ends 37 and 39 of the leaves 19 and 20, respectively, are carried by the frame 10 and will move vertically with the frame. Therefore, as the frame 10 moves down under a load, the bumper 41 will bear upon the frame since it does not move down the same distance as its trailing end 37. As a result, the leaf 19 will be loaded at the bumper 41 and will flex in proportion to frame down motion so that its effort to resist the down motion will increase with increased down motion at end 37. The down motion will flex the leaf and tend to shorten its effective length, whereupon the end 37 will hold firm and the end 38 will cause bumper 32 to slide or roll in the saddle 33. Likewise, the leaf 20 will react at bumper 45 against the leaf 19, but at a different rate to add resistance in a progressive manner. The flexing of leaf 20 will generally be greater than leaf 19, and this is provided for by making it longer and by allowing its end 39 to slide over the sleeve 30 in addition to the noted movement at the saddle end 40. The two leaves build up a resisting force to frame down load and assist the main coil spring 11 in a progressively increasing manner.

The leaf spring device 18 normally bears a portion of the normal vehicle weight due to the compression reaction at coil spring 11. This initial loading is found to be critical, as too much early or initial resistance tends to hold the frame too high and affects the ride characteristics. Tests have shown that the leaf spring 19 should be of a lighter gauge than leaf spring 20 in order to maintain a soft ride characteristic at normal or average load conditions. Since it is an object to progressively increase the resistance to loading offered by the device 18 it is necessary to have the leaf 19 more limber than leaf 20 because it comes into play first. On the other hand, localized flexing in the center portion of leaf 19 may be controlled by the addition of the auxiliary leaf 43 and longer service life will be obtained. But, as has been noted, when the leaf 19 is of lighter gauge than leaf 20 it will not pick up the initial load at too rapid a rate to greatly detract from the normal load ride conditions, and will progressively pass the load on to leaf 20 by causing the leaf 20 to flex to a much greater extent. This latter condition makes it necessary to provide greater length in leaf 20 so that the end 39 may ride or work in and out in the sleeve 30. As the load further increases, the leaf 20 will take an increasingly greater proportion than is taken by leaf 19.

In one installation tested, the overall effective length from the center line of action in hanger 21 to the center line of action at bumper 32 was approximately 22¼". As measured from the center line of action in hanger 21 to the center line of action in bumper 41 the distance was approximately 29% of the overall length. Similarly, bumper 45 was located a distance away from the hanger 21 of approximately 37% of the overall length. While these percentages should not be taken as limiting it is believed that the ratios represented thereby should be closely followed for superior results, and the difference in thickness or gauge of the leaf springs 19 and 20 should also be different so that too great early loading is avoided but a steady and progressive load resistance increase will take place. Also, since the device 18 will normally have some working reaction or slip at the saddle 33, as well as at the hanger 21 and bumpers 41 and 45, it is desirable to establish a small pre-load to hold the device in place. The pre-load is obtained by raising the frame 10 while installing the device 18 as shown in Fig. 5. This is done so that the ends 37 and 39 may be easily inserted in the hanger 21 and the device swung over under the frame 10 to line up the bumper 41 under the frame flange and bumper 32 in the saddle 33.

While one embodiment of the invention has been illustrated and described by way of example only, it will be understood that various changes and modifications may be made herein and that all equivalent means and parts are intended to be included wherever possible within the scope of the appended claims.

What is claimed is:

1. In a vehicle having a frame supported from the axle by a principal suspension spring, an auxiliary spring device disposed between the frame and axle to effect a progressively increasing load supporting lift on the frame to assist the principal suspension spring, said spring device including leaf members connected together at one end and separated at the opposite end, hanger means on the frame supporting the separated ends of said leaf members, a support surface on the axle to carry the connected ends of said leaf members, and bumper means carried by said spring device intermediate its ends in position to abut an adjacent part of the vehicle frame and to abuttingly engage between said leaf members, said leaf members being formed of different gauge resilient material to have different flexing reaction rates.

2. In a vehicle having a frame supported from the axle by a principal suspension spring, an auxiliary spring device disposed between the frame and axle to effect a progressively increasing load supporting lift on the frame, said spring device including spaced superposed leaf members connected together at one end and separated at the opposite end, hanger means on the frame separately supporting the separated ends of said leaf members, a common support on the axle to carry the connected ends of said leaf members, a first element on one of said leaf members intermediate the ends thereof in position to engage the vehicle frame, and a second element on another of said leaf members intermediate the ends thereof in position to engage said first one of said leaf members, said first and second elements being located at different distances between said hanger and common support to effect different flexing reaction rates of said leaf members in said spring device to progressively increase the resistance to frame movement.

3. An auxiliary spring device for a vehicle spring system arranged between the vehicle frame and axle and extending lengthwise of the vehicle frame, said auxiliary spring device including a support on the axle, a hanger on the frame spaced from said axle support, a first leaf member extending between said axle support and hanger, a bumper element on said first leaf member between the ends thereof to engage the frame and cause flexing of said first leaf member, a second leaf member extending between said axle support and hanger, a bumper element on said second leaf member between the ends thereof to engage said first leaf member spaced from the location of said bumper element on said first leaf member, flexing of said first leaf element causing flexing of said second leaf element at a different rate, and said hanger including separate means to carry said first and second leaf members in spaced relation.

4. The auxiliary spring device set forth in claim 3 wherein said first and second leaf members are connected together at said axle support and are free to move relative to said axle support to accommodate changes in length thereof under flexing reaction.

5. The auxiliary spring device set forth in claim 3 wherein said leaf members are formed of spring material having different thicknesses and different flexing reaction rates.

6. The auxiliary spring device set forth in claim 3 wherein said first leaf member is formed of spring material having a relatively lighter gauge than said second leaf member.

7. The auxiliary spring device set forth in claim 3 wherein said bumper element on said first leaf member is positioned closer to said hanger than said bumper element on said second leaf member.

8. The auxiliary spring device set forth in claim 3 wherein said bumper element on said first leaf member is positioned between said hanger and axle support and is spaced from said hanger a distance of the order of substantially 29% of the spacing between said hanger and axle support, and said bumper element on said second leaf member is spaced from said hanger a distance of the order of substantially 37% of the spacing between said hanger and axle support.

References Cited in the file of this patent
UNITED STATES PATENTS

| | | |
|---|---|---|
| 1,211,816 | Blackley | Jan. 9, 1917 |
| 1,494,281 | Page | May 13, 1924 |
| 2,301,398 | Haynes | Nov. 10, 1942 |
| 2,825,578 | Walker | Mar. 4, 1958 |